Patented Aug. 23, 1949

2,480,086

UNITED STATES PATENT OFFICE 2,480,086

MINERAL SUPPLEMENTS

Henry V. Moss and Louis E. Wells, Jr., Anniston, Ala., assignors to Monsanto Chemical Company, St. Louis, Mo., a corporation of Delaware No Drawing. Application September 2, 1947, Serial No. 771,696

23 Claims. (Cl. 99—11)

This invention relates to an improved mineral supplement containing calcium, phosphorus and iron.

An object of the invention is to provide an agglomerated mineral supplement which contains the proper balance of calcium, iron and phosphorus for ready assimilation by the human body.

An additional object is to provide an agglomerated mineral supplement of such particle size that it may be readily incorporated with cereals, other food products, seasonings or food ingredients such as salt, sugar or flour.

Another object is to provide an agglomerated mineral supplement possessing sufficient mechanical strength to permit mixing with food products or food ingredients without substantial disintegration of the supplement.

Another object is to provide an agglomerated mineral supplement of such form and character that it may be readily distributed uniformly and homogeneously throughout food products or food ingredients without settling, dusting or seggregation during shipment, storage or use of the foods or food ingredients with which it is mixed.

A further object is to provide an agglomerated mineral supplement containing calcium, phosphorus and iron, which when incorporated with cereals, is characterized by a substantially reduced tendency to produce rancidity as compared with commercially available supplements of the same general type.

Other objects and advantages of the present invention will become apparent as the description proceeds.

It is a well known fact that in the milling and refining of flour and other cereal products part of the naturally occurring mineral constituents such as calcium, iron and phosphorus are removed. Consequently, it has been the practice to restore these mineral constituents to the above products by adding thereto calcium, phosphorus and iron salts or mixtures thereof.

For example, calcium phosphates, an iron oxide saccharate solution, ferric chloride, ferric orthophosphate, iron phytate, sodium ferric pyrophosphate and mixtures of tricalcium phosphate and ferric orthophosphate have been employed as mineral supplements for various food products, but for one reason or another they have not been entirely satisfactory.

Thus, calcium phosphates provide a satisfactory means for supplying calcium and phosphorus to the diet, but as iron is also essential, it is necessary to mix an iron salt therewith and then incorporate the mixture into the cereal product. However, this procedure is objectionable because it is necessary to mix a relatively large proportion of the calcium salt with the iron salt in order to obtain a proper balance of calcium and iron, or more specifically calcium, iron and phosphorus, and it is an extremely difficult and tedious task to obtain homogeneous mixing of such dissimilar amounts of material. Moreover, as the particle size of the components of the mixture, as ordinarily produced, is so much less than that of some cereals, uniform distribution of the salt mixture is practically impossible with the result that the concentration of the components of the salt mixture as well as the mixture itself is either too low or too high in some portions of the cereal product.

Ferric chloride, ferric orthophosphate, iron phytate, sodium ferric pyrophosphate and an iron oxide saccharate solution do not supply calcium to the diet and, therefore, they are unsatisfactory supplements per se and if they are mixed with calcium salts such as calcium phosphates, the problems of intimate and uniform mixing outlined above are encountered. Ferric chloride is also objectionable because it induces rancidity, imparts a bad flavor to the cereal product and has an unfavorable effect on the gluten of flour. Iron phytate also has the disadvantage of not being readily assimilable by the human system and ferric orthophosphate, when used alone or in combination with tricalcium phosphate, is also subject to the objectionable property of inducing rancidity in flour and other cereal products. Finally, according to Patent 2,357,609 to Barackman, the use of sodium ferric pyrophosphate as a mineral supplement is limited to compositions providing a pH of at least approximately 7.

Now we have made the surprising discovery that by blending together sodium acid pyrophosphate, sodium ferric pyrophosphate and a suitable calcium salt in the proportions and in the manner hereinafter described, a mineral supplement is obtained which overcomes the abovementioned difficulties. Thus, whereas the prior art products including ferric orthophosphate or sodium ferric pyrophosphate have been restricted to compositions of a relatively high pH, the mineral supplement of the present invention may be adjusted in composition so as to yield products having a pH of from 5.1 to 6.9, or preferably from 5.5 to 6.8, without appreciably accelerating the production of rancidity in cereals and other food products.

The mineral supplement of the present invention is provided in the form of cream colored stable, free flowing agglomerates or aggregates which are characterized by excellent mechanical strength. These agglomerates or aggregates, when properly proportioned as to composition so as to provide a product having a Fe/Ca weight ratio of from about 0.04 to about 0.10 and a pH in 1% water suspension of from 5.1 to 6.9, are eminently suitable for supplying calcium, iron and phosphorus to the diet and they are further characterized by the fact that they possess the surprising property of not accelerating to an undesired degree the production of rancidity in flour and similar cereal products.

The foregoing mineral supplement is produced by forming a homogeneous aqueous slurry of an innocuous calcium salt, sodium acid pyrophosphate and sodium ferric pyrophosphate, drying the slurry, grinding and then screening the product to the desired size. In preparing the slurry, the order of addition of the above salts is not critical, but it is preferable to introduce the calcium salt first and then successively mix therewith sodium acid pyrophosphate, sodium ferric pyrophosphate and, if desired, starch or another suitable filler or auxiliary binder. The sodium acid pyrophosphate content of the composition has the desirable effect of reducing the viscosity of the mix and thus permits increasing the solids content of the slurry and facilitates mixing and drying same. It also serves as a binder in the agglomerates and, what is more important, it markedly decreases the tendency of the sodium ferric pyrophosphate to accelerate the rancidity of food products with which the mineral supplement is admixed.

The agglomerates are composed of a number of substantially water insoluble particles of an exceedingly homogeneous and intimate mixture of sodium ferric pyrophosphate and the innocuous calcium salt, which particles are solubly bonded together to form the above agglomerates by means of sodium acid pyrophosphate. In fact, the sodium ferric pyrophosphate and the calcium salt are so intimately and closely intermixed that they act as individual particles. Therefore, if the agglomerates are broken down into their individual particles, it will be found that the latter have the same chemical composition as the agglomerates.

The sodium ferric pyrophosphate and the calcium salts are employed in the powdered state, that is, they are so finely divided that the individual particles are not distinguishable between the fingers or between the teeth. Stated more specifically, the particle size of the mixture of sodium ferric pyrophosphate and the calcium salts is less than 200 mesh and preferably from 200 to 400 mesh, although it is to be understood that the invention is not limited thereto.

The sizing of the agglomerates is controlled by the particle size of food product or food ingredient to be fortified. Thus it is desirable that the agglomerates be produced in sizes which are substantially identical with that of the material to be blended with the supplement. For example, when the supplement is to be mixed with cereal products such as Farina, the agglomerates are sized so as to pass a 20 mesh screen and be retained by a 200 mesh screen.

When the mineral supplement is to be blended with a relatively highly colored cereal, it may be colored to correspond with that of the cereal and this may be achieved by adding a suitable food coloring to the slurry during its preparation or it may be applied to the surface of the supplement in any convenient manner.

For a more complete understanding of the present invention reference is made to the following examples.

*Example I*

1000 grams of a slurry of tricalcium phosphate containing 20% solids was heated to a temperature of from 55° C. to 60° C. and then 76.6 grams of monosodium phosphate was added with stirring until these salts were thoroughly and uniformly mixed together. Upon completing this operation, 14.3 grams of ferric orthophosphate and 15.4 grams of starch were successively added with continued stirring to yield a slurry having a pH of about 5.0. After the components of the slurry had been uniformly and homogeneously blended together, the resulting product was dried on pyrex plates at a temperature of from 130° C. to 135° C. in a forced draft oven for 1 hour.

The dried product was scraped from the pyrex plates, gently ground and sized to yield cream-colored, free flowing agglomerates having a particle size range of from −20 to 200 mesh. These agglomerates had substantially the following properties and composition:

| | |
|---|---|
| CaO | percent 34.22 |
| $P_2O_5$ | do 43.04 |
| $Fe_2O_3$ | do 2.29 |
| $Na_2O$ | do 6.36 |
| Ign. loss | do 14.09 |
| Fe/Ca | 0.06 |
| pH of 1% suspension | 5.85 |

A 200 gram sample of Farina was enriched with 3.61 grams of the above supplement and the mixture stored at a temperature of about 55° C. in sealed bottles. The enriched product was tested for rancidity periodically and it was found to be rancid after 14 days.

*Example II*

The above procedure was repeated except that 76.6 grams of sodium acid pyrophosphate was substituted for the monosodium phosphate used in Example I.

The resulting product had substantially the following composition and properties.

| | |
|---|---|
| CaO | percent 34.49 |
| $P_2O_5$ | do 44.33 |
| $Fe_2O_3$ | do 2.22 |
| Ign. loss | do 12.00 |
| Fe/Ca | 0.06 |
| pH of 1% slurry | 6.0 |

A 200 gram sample of Farina was enriched with 3.58 grams of the foregoing supplement and the mixture stored under the same conditions as in Example I. This enriched product likewise became rancid after 14 days, thus showing that the substitution of monosodium orthophosphate by sodium acid pyrophosphate produced no improvement in the supplement.

*Example III*

The procedure described in Example I was repeated using 27.1 grams of sodium ferric pyrophosphate instead of 14.3 grams of ferric orthophosphate as in Example I.

The agglomerated product thus prepared was characterized by the following composition and properties:

| | |
|---|---|
| CaO | percent 33.06 |
| $P_2O_5$ | do 42.79 |
| $Fe_2O_3$ | do 2.00 |
| Ign. loss | do 15.07 |
| Fe/Ca | 0.06 |
| pH of 1% slurry | 5.95 |

A 200 gram sample of Farina was enriched with 3.74 grams of the product of the foregoing example and the mixture stored and tested for rancidity as in Examples I and II. It was found that the enriched product became rancid after 30 days, thus demonstrating that the substitution of ferric orthophosphate by sodium ferric pyrophosphate did effect a substantial improvement in the mineral supplement from the standpoint of reducing its tendency to accelerate rancidity.

*Example IV*

1000 grams of a slurry of tricalcium phosphate containing approximately 20% solids was heated to a temperature of from 55° C. to 60° C. and then 76.6 grams of sodium acid pyrophosphate was introduced with stirring until these salts were intimately and thoroughly mixed together. At the end of this operation, 27.1 grams of sodium ferric pyrophosphate and 15.4 grams of starch were successively added and the stirring continued to yield a slurry having a pH of about 5.25. The resulting slurry was then dried on pyrex plates at a temperature of from 130° C. to 135° C. in a forced draft oven for 1 hour.

The dried product was scraped from the pyrex plates, gently ground and sized to yield cream-colored, free flowing agglomerates having a particle size range of from −20 to 200 mesh. These agglomerates were characterized by the substantial absence of a tendency to accelerate the promotion of rancidity and also by their excellent mechanical strength which adapted them for mixing with cereal products or food ingredients without substantial disintegration.

On analysis, the agglomerates were found to have the following composition and properties.

| | |
|---|---|
| CaO _____ percent__ | 32.17 |
| $P_2O_5$ _____ do____ | 43.22 |
| $Fe_2O_3$ _____ do____ | 1.93 |
| $Na_2O$ _____ do____ | 7.63 |
| Ign. loss _____ do____ | 15.05 |
| Fe/Ca _____ | 0.06 |
| pH of 1% slurry_____ | 6.15 |

A 3.84 gram sample of the product of the foregoing example was mixed with 200 grams of Farina and the resulting mixture stored as in Example I. The enriched product was periodically tested and found to show no evidence of rancidity after 59 days.

In view of the results obtained in Example IV as compared with Examples I–III inclusive, it is obvious that a highly beneficial effect is obtained by substituting ferric orthophosphate and monosodium phosphate in Example I by sodium ferric pyrophosphate and sodium acid pyrophosphate respectively.

In preparing the mineral supplement of the present invention, the component salts are mixed together in the following range of proportions, it being understood that the invention is not restricted thereto:

| | Percent |
|---|---|
| Tricalcium phosphate _____ | 40–80 |
| Sodium acid pyrophosphate _____ | 15–30 |
| Sodium ferric pyrophosphate (9–15% Fe)_ | 5–18 |
| Starch or other edible inert filler _____ | 0–12 |

The above compositions are characterized by having a pH in 1% slurry of from about 5.0 to about 6.9 and within the above range the following composition having a pH of about 5.95 is preferred since it has substantially no tendency to catalyze the production of rancidity in cereal products.

| | Percent |
|---|---|
| Tricalcium phosphate _____ | 66 |
| Sodium acid pyrophosphate _____ | 25 |
| Sodium ferric pyrophosphate (15.85% Fe)__ | 9 |

It is desirable that the components of the mineral supplement be proportioned so as to provide compositions having a weight ratio of Ca to P of about 2 to 1 and a weight ratio of Fe/Ca of about 0.04 to about 0.10 and within this range a Fe/Ca ratio of about 0.06 is preferred.

In place of tricalcium phosphate, dicalcium phosphate and tetracalcium phosphate may be employed and where for nutritional purposes a higher Ca/P ratio is desired, the foregoing calcium salts may be completely or partially replaced by calcium sulfate, calcium carbonate or equivalent calcium salts.

Stated broadly, the present invention is directed to a mineral supplement including a calcium salt of the type indicated above, sodium acid pyrophosphate and sodium ferric pyrophosphate, wherein these salts are so proportionated as to yield a composition containing calcium, phosphorus and iron in the following range of percentages by weight.

| | Percent |
|---|---|
| Ca _____ | 14.4–28.8 |
| P _____ | 12.4–26.6 |
| Fe _____ | 0.8– 2.9 |

The mineral supplement of the present invention may be used to enrich food products, food ingredients and cereal products derived from wheat, corn, rice and oats in the form of flour, grits or specialized articles such as flakes, exploded cereals or rolled oats. The amount of supplement used will vary with the composition of the supplement and the product to be enriched, but in cereals about 1% to 3% by weight is satisfactory. Stated more specifically, it is desirable to add a sufficient amount of the mineral supplement to supply about 2000 mg. of Ca and about 120 mg. of Fe per pound of cereal.

While we have described our invention in detail, it should be understood that many changes may be made therein without departing from the spirit thereof.

What we claim is:

1. A mineral supplement comprising an innocuous calcium salt, sodium ferric pyrophosphate and sodium acid pyrophosphate.

2. A mineral supplement comprising an innocuous calcium salt, sodium ferric pyrophosphate and from about 15% to 30% by weight of sodium acid pyrophosphate.

3. A mineral supplement comprising an innocuous calcium salt, about 5% to 18% by weight of sodium ferric pyrophosphate and sodium acid pyrophosphate.

4. A mineral supplement comprising an innocuous calcium salt, about 5% to 18% by weight of sodium ferric pyrophosphate and about 15% to about 30% by weight of sodium acid pyrophosphate.

5. A mineral supplement comprising agglomerates composed of a large number of substantially water insoluble particles of a finely divided intimate mixture of sodium ferric pyrophosphate and an innocuous calcium salt, said particles being solubly bonded together into said agglomerates by means of sodium acid pyrophosphate.

6. A mineral supplement comprising agglomerates composed of a large number of substantially water insoluble particles of a finely divided intimate mixture of sodium ferric pyrophosphate and tricalcium phosphate, said particles being solubly bonded together into said agglomerates by means of sodium acid pyrophosphate.

7. A mineral supplement comprising agglomerates composed of a large number of substantially water insoluble particles of a finely divided intimate mixture of sodium ferric pyrophosphate and tricalcium phosphate, said particles having a screen size of less than 200 mesh and being solubly bonded together into said agglomerates by means of sodium acid pyrophosphate.

8. A mineral supplement comprising agglomerates composed of a large number of substantially water insoluble particles of a finely divided intimate mixture of sodium ferric pyrophosphate and tricalcium phosphate, said particles having a screen size of from 200 to 400 mesh and being solubly bonded together into said agglomerates by means of sodium acid pyrophosphate.

9. A mineral supplement comprising agglomerates composed of a large number of substantially water insoluble particles of a finely divided intimate mixture of sodium ferric pyrophosphate and an innocuous calcium salt, said particles being solubly bonded together to form said agglomerates by means of sodium acid pyrophosphate and said supplement being further characterized by containing calcium, iron and phosphorus in the following range of percentages by weight.

| | Percent |
|---|---|
| Ca | 14.4–28.8 |
| P | 12.4–26.6 |
| Fe | .8– 2.9 |

10. A mineral supplement comprising agglomerates composed of a number of substantially water insoluble particles of a finely divided intimate mixture of sodium ferric pyrophosphate and tricalcium phosphate, said particles being solubly bonded together to form said agglomerates by means of sodium acid pyrophosphate and said supplement being characterized by having substantially the following composition:

| | Percent |
|---|---|
| Tricalcium phosphate | 40–80 |
| Sodium ferric pyrophosphate | 5–18 |
| Sodium acid pyrophosphate | 15–30 |
| Starch and other edible inert fillers | 0–12 |

11. A mineral supplement comprising agglomerates composed of a number of substantially water insoluble particles of a finely divided intimate mixture of sodium ferric pyrophosphate and tricalcium phosphate, said particles being solubly bonded together to form said agglomerates by means of sodium acid pyrophosphate and said supplement being characterized by having substantially the following composition:

| | Percent |
|---|---|
| Tricalcium phosphate | 66 |
| Sodium ferric pyrophosphate | 9 |
| Sodium acid pyrophosphate | 25 |

12. A food product comprising cereals and a relatively small proportion of a mineral supplement comprising agglomerates composed of a number of substantially water insoluble particles of a finely divided intimate mixture of sodium ferric pyrophosphate and an innocuous calcium salt, said particles being solubly bonded together to form said agglomerates by means of sodium acid pyrophosphate.

13. The process of producing an improved mineral supplement, which comprises forming a homogeneous aqueous slurry containing an innocuous calcium salt, sodium ferric pyrophosphate and sodium acid pyrophosphate, drying said slurry, grinding and then screening the dried product, said salts being so proportioned as to provide a product containing calcium, phosphorus and iron in the following range of percentages by weight.

| | Percent |
|---|---|
| Ca | 14.4–28.8 |
| P | 12.4–26.6 |
| Fe | 0.8– 2.9 |

14. The process of producing an improved mineral supplement, which comprises forming a homogeneous aqueous slurry containing tricalcium phosphate, sodium ferric pyrophosphate and sodium acid pyrophosphate, drying said slurry, grinding and then screening the dried product, said salts being so proportioned as to provide a product containing calcium, phosphorus and iron in the following range of percentages by weight.

| | Percent |
|---|---|
| Ca | 14.4–28.8 |
| P | 12.4–26.6 |
| Fe | 0.8– 2.9 |

15. The process of producing an improved mineral supplement, which comprises forming a homogeneous aqueous slurry containing dicalcium phosphate, sodium ferric pyrophosphate and sodium acid pyrophosphate, drying said slurry, grinding and then screening the dried product, said salts being so proportioned as to provide a product containing calcium, phosphorus and iron in the following range of percentages by weight.

| | Percent |
|---|---|
| Ca | 14.4–28.8 |
| P | 12.4–26.6 |
| Fe | 0.8– 2.9 |

16. The process of producing an improved mineral supplement, which comprises forming a homogeneous aqueous slurry containing tetra calcium pyrophosphate, sodium ferric pyrophosphate and sodium acid pyrophosphate, drying said slurry, grinding and then screening the dried product, said salts being so proportioned as to provide a product containing calcium, phosphorus and iron in the following range of percentages by weight.

| | Percent |
|---|---|
| Ca | 14.4–28.8 |
| P | 12.4–26.6 |
| Fe | 0.8– 2.9 |

17. The process of producing an improved mineral supplement, which comprises forming a homogeneous slurry containing tricalcium phosphate, sodium ferric pyrophosphate, sodium acid pyrophosphate and, if desired, an edible inert filler, drying said slurry, grinding and then screening the dried product, said salts and said filler being so proportioned as to provide a product containing said components in the following range of percentages by weight.

| | Percent |
|---|---|
| Tricalcium phosphate | 40–80 |
| Sodium ferric pyrophosphate (9–16 Fe) | 5–18 |
| Sodium acid pyrophosphate | 15–30 |
| Edible inert filler | 0–12 |

18. The process of producing an improved mineral supplement, which comprises forming a homogeneous slurry containing tricalcium phosphate, sodium ferric pyrophosphate and sodium acid pyrophosphate, drying said slurry, grinding and then screening the dried product, said salts being so proportioned as to provide a product containing said components in the following percentages by weight.

| | Percent |
|---|---|
| Tricalcium phosphate | 66 |
| Sodium ferric pyrophosphate | 9 |
| Sodium acid pyrophosphate | 25 |

19. A mineral supplement comprising agglomerates composed of a number of substantially water insoluble particles of a finely divided intimate mixture of sodium ferric pyrophosphate and and innocuous calcium salt, said particles being solubly bonded together to form said agglomerates by means of sodium acid pyrophosphate and said supplement being further characterized by containing said salts in a Ca/P weight ratio of approximately 2:1.

20. A mineral supplement comprising agglomerates composed of a number of substantially water insoluble particles of a finely divided intimate mixture of sodium ferric pyrophosphate and an innocuous calcium salt, said particles being solubly bonded together to form said agglomerates by means of sodium acid pyrophosphate and said supplement being further characterized by containing said salts in a Fe/Ca weight ratio of from about 0.04 to about 0.10.

21. A mineral supplement comprising agglomerates composed of a number of substantially water insoluble particles of a finely divided intimate mixture of sodium ferric pyrophosphate and tricalcium phosphate, said particles being solubly bonded together to form said agglomerates by means of sodium acid pyrophosphate and said supplement being further characterized by containing said salts in a Ca/P weight ratio of about 2:1 and a Fe/Ca weight ratio of about 0.06.

22. A mineral supplement comprising agglomerates composed of a number of substantially water insoluble particles of a finely divided intimate mixture of sodium ferric pyrophosphate and tricalcium phosphate, said particles being solubly bonded together to form said agglomerates by means of sodium acid pyrophosphate and said supplement being further characterized by having a pH in 1% slurry of from about 5.0 to about 6.9.

23. A mineral supplement comprising agglomerates composed of a number of substantially water insoluble particles of a finely divided intimate mixture of sodium ferric pyrophosphate and tricalcium phosphate, said particles being solubly bonded together to form said agglomerates by sodium acid pyrophosphate and said supplement being further characterized by containing said salts in a Ca/P weight ratio of about 1:3.

HENRY V. MOSS.
LOUIS E. WELLS, Jr.

REFERENCES CITED

The following references are of record in the file of this patent:

UNITED STATES PATENTS

| Number | Name | Date |
|---|---|---|
| 2,222,830 | Moss | Nov. 26, 1940 |
| 2,259,543 | Billings | Oct. 21, 1941 |
| 2,357,069 | Barackman | Aug. 29, 1944 |
| 2,365,438 | Schilb | Dec. 19, 1944 |